United States Patent
Wu et al.

(10) Patent No.: US 10,331,470 B2
(45) Date of Patent: Jun. 25, 2019

(54) VIRTUAL MACHINE CREATION ACCORDING TO A REDUNDANCY POLICY

(71) Applicant: Huawei Technologies Co., Ltd., Shenzhen (CN)

(72) Inventors: Xiangyang Wu, Xi'an (CN); Yajun Zhang, Xi'an (CN); Rong Chen, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 149 days.

(21) Appl. No.: 15/467,513

(22) Filed: Mar. 23, 2017

(65) Prior Publication Data
US 2017/0192817 A1 Jul. 6, 2017

Related U.S. Application Data

(63) Continuation of application No. PCT/CN2015/083380, filed on Jul. 6, 2015.

(30) Foreign Application Priority Data

Sep. 24, 2014 (CN) .......................... 2014 1 0495044

(51) Int. Cl.
*G06F 9/46* (2006.01)
*G06F 9/455* (2018.01)
(Continued)

(52) U.S. Cl.
CPC .......... *G06F 9/45558* (2013.01); *G06F 9/455* (2013.01); *G06F 11/1658* (2013.01);
(Continued)

(58) Field of Classification Search
None
See application file for complete search history.

(56) References Cited

U.S. PATENT DOCUMENTS

| | | | |
|---|---|---|---|
| 6,687,846 B1 * | 2/2004 | Adrangi | G06F 11/0709 |
| | | | 714/17 |
| 9,529,683 B2 | 12/2016 | Wu et al. | |

(Continued)

FOREIGN PATENT DOCUMENTS

| CN | 102629224 A | 8/2012 |
|---|---|---|
| CN | 103095834 A | 5/2013 |

(Continued)

OTHER PUBLICATIONS

Machine Translation and Abstract of Chinese Publication No. CN104268001, Jan. 7, 2015, 18 pages.

(Continued)

*Primary Examiner* — Wissam Rashid
(74) *Attorney, Agent, or Firm* — Conley Rose, P.C.

(57) ABSTRACT

A virtual machine creation method and apparatus are provided to automatically create a virtual machine, and avoid an error that occurs during creation of the virtual machine. The method includes obtaining, by a cloud management platform at a production site, a first redundancy policy, obtaining, by the cloud management platform, storage replication information from M storage devices at the production site, determining, by the cloud management platform based on the storage replication information and from the M storage devices, N storage devices that meet the first redundancy policy, where N is an integer, and N≤M, controlling, by the cloud management platform, a virtualization platform to create a virtual machine, and instructing, in a virtual machine creation request, to create a magnetic disk used by the virtual machine on the N storage devices to create the virtual machine.

16 Claims, 3 Drawing Sheets

(51) Int. Cl.
 *G06F 16/27* (2019.01)
 *G06F 11/16* (2006.01)
 *H04L 29/08* (2006.01)
 *G06F 11/20* (2006.01)

(52) U.S. Cl.
 CPC ...... *G06F 11/2094* (2013.01); *G06F 11/2097* (2013.01); *G06F 16/27* (2019.01); *H04L 67/1095* (2013.01); *G06F 2009/45562* (2013.01); *G06F 2009/45583* (2013.01); *G06F 2201/815* (2013.01)

(56) References Cited

U.S. PATENT DOCUMENTS

| | | | | |
|---|---|---|---|---|
| 2013/0111260 | A1* | 5/2013 | Reddy | G06F 11/2041 714/4.11 |
| 2013/0111471 | A1 | 5/2013 | Chandrasekaran et al. | |
| 2014/0281257 | A1* | 9/2014 | Hochberg | G06F 3/065 711/135 |
| 2015/0261558 | A1* | 9/2015 | Robinson | G06F 9/45558 718/1 |

FOREIGN PATENT DOCUMENTS

| | | |
|---|---|---|
| CN | 103389910 A | 11/2013 |
| CN | 103647849 A | 3/2014 |
| CN | 103795742 A | 5/2014 |
| CN | 103843284 A | 6/2014 |
| CN | 104268001 A | 1/2015 |

OTHER PUBLICATIONS

Foreign Communication From a Counterpart Application, PCT Application No. PCT/CN2015/083380, English Translation of International Search Report dated Oct. 8, 2015, 2 pages.
Foreign Communication From a Counterpart Application, PCT Application No. PCT/CN2015/083380, English Translation of Written Opinion dated Oct. 8, 2015, 6 pages.
Foreign Communication From a Counterpart Application, Chinese Application No. 201410495044.6, Chinese Office Action dated Jan. 19, 2017, 5 pages.
"CloudSpider: Combining Replication with Scheduling for Optimizing Live Migration of Virtual Machines Across Wide Area Networks," XP032004335, May 23, 2011, pp. 13-22.
Foreign Communication From a Counterpart Application, European Application No. 15845441.3, Extended European Search Report dated Sep. 20, 2017, 8 pages.

* cited by examiner

VIRTUAL MACHINE CREATION ACCORDING TO A REDUNDANCY POLICY

CROSS-REFERENCE TO RELATED APPLICATIONS

This application is a continuation of International Patent Application No. PCT/CN2015/083380 filed on Jul. 6, 2015, which claims priority to Chinese Patent Application No. 201410495044.6 filed on Sep. 24, 2014. The disclosures of the aforementioned applications are hereby incorporated by reference in their entireties.

TECHNICAL FIELD

The present disclosure relates to the field of electronics technology, and in particular, to a virtual machine creation method and a virtual machine creation apparatus.

BACKGROUND

In many existing production systems, redundancy protection is required for critical service data. To implement redundancy protection, there are generally two sites. One site is a production site that provides a data service for users, and the other site is a redundancy site that does not provide a data service for users in general cases. During operation of the production site, the production site replicates data to a virtual machine at the redundancy site such that when the production site suffers from unrecoverable damage, the redundancy site can be enabled to replace the production site, and continue to provide a data service for the users based on the data in the virtual machine.

A virtual machine creation process is as follows.

First, an administrator receives, on a cloud management platform at the production site, a redundancy policy delivered by a user. The redundancy policy includes a redundancy requirement of the user. Then, according to memories of the administrator or records of an offline carrier (for example, a notepad), the administrator selects, from multiple storage devices, a storage device that meets the redundancy policy. Finally, the administrator creates a virtual machine on the storage device that meets the redundancy policy.

It can be learnt that, virtual machine creation depends on manual intervention of an administrator. Such a manner does not adapt to an automation trend, and error-prone.

SUMMARY

Embodiments of the present disclosure provide a virtual machine creation method and a virtual machine creation apparatus to automatically create a virtual machine, and avoid an error that occurs during creation of the virtual machine.

A first aspect of this application provides a virtual machine creation method, including obtaining, by a cloud management platform at a production site, a first redundancy policy, where the first redundancy policy includes a requirement for a redundancy site and a time interval requirement for replicating data from the production site to the redundancy site, and the requirement for the redundancy site includes a requirement for a data replication direction of the production site, obtaining, by the cloud management platform, storage replication information from M storage devices at the production site, where the storage replication information indicates a data replication direction of each of the M storage devices and a data replication time interval of each storage device, and M is a positive integer, determining, by the cloud management platform based on the storage replication information and from the M storage devices, N storage devices that meet the first redundancy policy, where N is an integer, and N≤M, controlling, by the cloud management platform, a virtualization platform to create a virtual machine, and instructing, in a virtual machine creation request, to create a magnetic disk used by the virtual machine on the N storage devices, to create the virtual machine.

With reference to the first aspect, in a first possible implementation manner of the first aspect, obtaining, by the cloud management platform, storage replication information from M storage devices at the production site includes obtaining, by the cloud management platform, the storage replication information provided by each storage device.

With reference to the first aspect, in a second possible implementation manner of the first aspect, obtaining, by the cloud management platform, storage replication information from M storage devices at the production site includes sending, by the cloud management platform, a query request to the virtualization platform at the production site, and obtaining, by the cloud management platform, the storage replication information obtained by the virtualization platform by querying the M storage devices based on the query request.

With reference to the first possible implementation manner of the first aspect or the second possible implementation manner of the first aspect, in a third possible implementation manner of the first aspect, determining, from the M storage devices, N storage devices includes determining, from the M storage devices according to the storage replication information, K storage devices whose data replication direction meets the requirement for the data replication direction, where N≤K≤M, and K is an integer, and determining, from the K storage devices according to the data replication time interval, the N storage devices that meet the requirement for the data replication time interval.

With reference to the first aspect, in a fourth possible implementation manner of the first aspect, after instructing, in a virtual machine creation request, to create a magnetic disk used by the virtual machine on the N storage devices, the method includes creating a second redundancy policy corresponding to the first redundancy policy, where the first redundancy policy runs on the cloud management platform, and the second redundancy policy runs on redundancy software of the production site, and adding the virtual machine to the second redundancy policy.

With reference to the fourth possible implementation manner of the first aspect, in a fifth possible implementation manner of the first aspect, after adding the virtual machine to the second redundancy policy, the method further includes replicating the second redundancy policy to the redundancy site, where the redundancy site provides a redundancy capability for the production site.

A second aspect of this application provides a virtual machine creation apparatus, including a first obtaining unit configured to obtain a first redundancy policy, where the first redundancy policy includes a requirement for a redundancy site and a time interval requirement for replicating data from a production site to the redundancy site, and the requirement for the redundancy site includes a requirement for a data replication direction of the production site, a second obtaining unit configured to obtain storage replication information from M storage devices at the production site, where the storage replication information indicates a data replication direction of each of the M storage devices and a data replication time interval of each storage device, and M is a positive integer, a determining unit configured to determine, based on the storage replication information and from the M storage devices, N storage devices that meet the first redundancy policy, where N is an integer, and N≤M, and a creation unit configured to control a virtualization platform to create a virtual machine, and instruct, in a virtual machine creation request, to create a magnetic disk used by the virtual machine on the N storage devices, to create the virtual machine.

With reference to the second aspect, in a first possible implementation manner of the second aspect, the second obtaining unit is configured to obtain the storage replication information provided by each storage device.

With reference to the second aspect, in a second possible implementation manner of the second aspect, the second obtaining unit is further configured to send a query request to the virtualization platform at the production site, and obtain the storage replication information that is obtained by the virtualization platform by querying the M storage devices based on the query request.

With reference to the first possible implementation manner of the second aspect or the second possible implementation manner of the second aspect, in a third possible implementation manner of the second aspect, the determining unit is configured to determine, from the M storage devices according to the storage replication information, K storage devices whose data replication direction meets the requirement for the data replication direction, where N≤K≤M, and K is an integer, and determine, from the K storage devices according to the data replication time interval, the N storage devices that meet the requirement for the data replication time interval.

With reference to the second aspect, in a fourth possible implementation manner of the second aspect, the creation unit further configured to create a second redundancy policy corresponding to the first redundancy policy after instructing, in the virtual machine creation request, to create the magnetic disk used by the virtual machine on the N storage devices, where the first redundancy policy runs on a cloud management platform, and the second redundancy policy runs on redundancy software of the production site, and add the virtual machine to the second redundancy policy.

With reference to the fourth possible implementation manner of the second aspect, in a fifth possible implementation manner of the second aspect, the apparatus further includes a replication unit configured to replicate the second redundancy policy to the redundancy site after the virtual machine is added to the second redundancy policy, where the redundancy site provides a redundancy capability for the production site.

A third aspect of this application provides an electronic device, including a processor configured to obtain a first redundancy policy, where the first redundancy policy includes a requirement for a redundancy site and a time interval requirement for replicating data a the production site to the redundancy site, and the requirement for the redundancy site includes a requirement for a data replication direction of the production site, obtain storage replication information from M storage devices at the production site, where the storage replication information indicates a data replication direction of each of the M storage devices and a data replication time interval of each storage device, and M is a positive integer, determine, based on the storage replication information and from the M storage devices, N storage devices that meet the first redundancy policy, where N is an integer, and N≤M, and control a virtualization platform to create a virtual machine, and instruct, in a virtual machine creation request, to create a magnetic disk used by the virtual machine on the N storage devices, to create the virtual machine.

With reference to the third aspect, in a first possible implementation manner of the third aspect, the processor is further configured to obtain the storage replication information provided by each storage device.

With reference to the third aspect, in a second possible implementation manner of the third aspect, the processor is further configured to send a query request to the virtualization platform at the production site, and obtain the storage replication information that is obtained by the virtualization platform by querying the M storage devices based on the query request.

With reference to the first possible implementation manner of the third aspect or the second possible implementation manner of the third aspect, in a third possible implementation manner of the third aspect, the processor is further configured to determine, from the M storage devices according to the storage replication information, K storage devices whose data replication direction meets the requirement for the data replication direction, where N≤K≤M, and K is an integer, and determine, from the K storage devices according to the data replication time interval, the N storage devices that meet the requirement for the data replication time interval.

With reference to the third aspect, in a fourth possible implementation manner of the third aspect, the processor is further configured to create a second redundancy policy corresponding to the first redundancy policy after instructing, in the virtual machine creation request, to create the magnetic disk used by the virtual machine on the N storage devices, where the first redundancy policy runs on a cloud management platform, and the second redundancy policy runs on redundancy software of the production site, and add the virtual machine to the second redundancy policy.

With reference to the fourth possible implementation manner of the third aspect, in a fifth possible implementation manner of the third aspect, the processor is further configured to replicate the second redundancy policy to the redundancy site after adding the virtual machine to the second redundancy policy, where the redundancy site provides a redundancy capability for the production site.

One or more technical solutions in the embodiments of the present disclosure have at least the following technical effects or advantages.

First, a cloud management platform at a production site obtains a first redundancy policy, where the first redundancy policy includes a requirement for a redundancy site and a time interval requirement for replicating data from the production site to the redundancy site. Subsequently, the cloud management platform obtains storage replication information from M storage devices at the production site, where the storage replication information indicates a data replication direction of each of the M storage devices and a data replication time interval of each storage device. Afterwards, the cloud management platform determines, based on the storage replication information and from the M storage devices, N storage devices that meet the first redundancy policy. Finally, the cloud management platform controls a virtualization platform to create a virtual machine, and instructs, in a virtual machine creation request, to create a magnetic disk used by the virtual machine on the N storage devices. Therefore, according to the solutions provided in the embodiments of the present disclosure, the cloud management platform can automatically select, from M storage devices according to storage replication information, N storage devices that meet a first redundancy policy, and create a magnetic disk of a virtual machine on the N storage devices, to further create the virtual machine. In this way, manual intervention is no longer required during a virtual machine creation process such that a possibility of errors caused by manual intervention is reduced, and automatic creation of the virtual machine is implemented.

DESCRIPTION OF EMBODIMENTS

Figure 1:
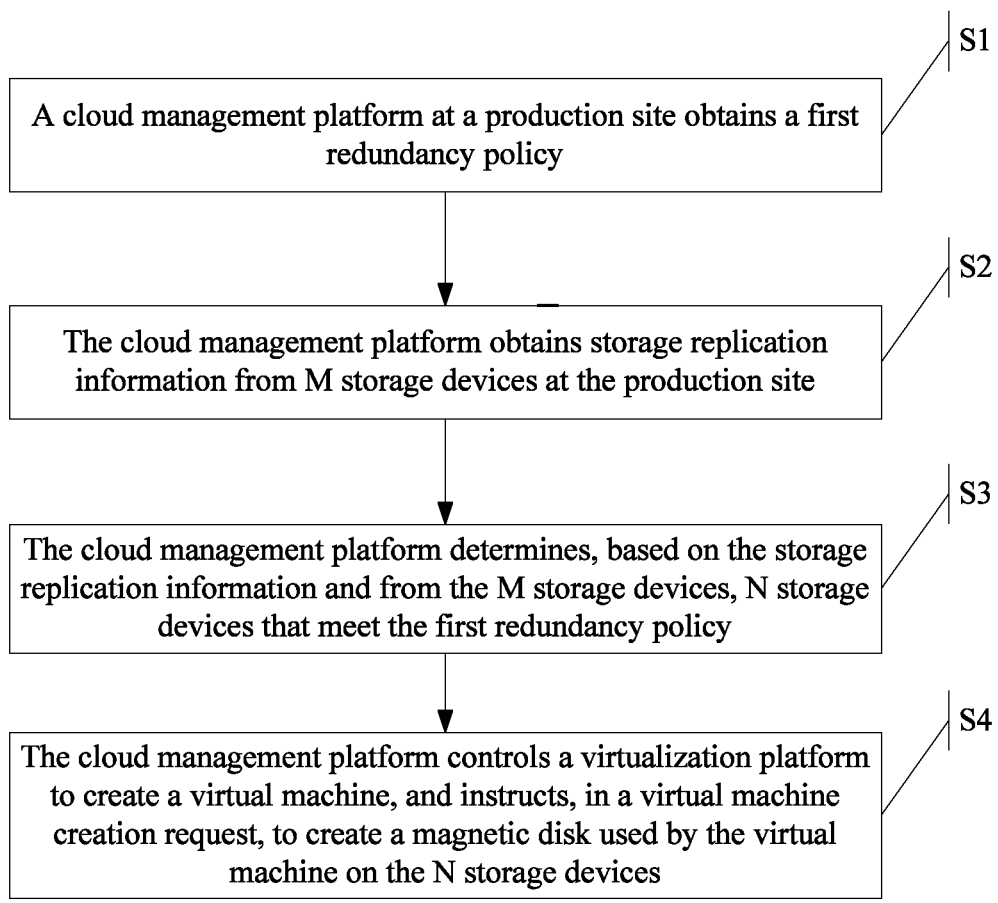
FIG. 1 is a flowchart of a virtual machine creation method according to an embodiment of the present disclosure.

Embodiments of the present disclosure provide a virtual machine creation method and a virtual machine creation apparatus to automatically create a virtual machine, and avoid an error that occurs during creation of the virtual machine.

In technical solutions of the embodiments of the present disclosure, to resolve the foregoing technical problems, the virtual machine creation method in the present disclosure is as follows.

First, a cloud management platform at a production site obtains a first redundancy policy. The first redundancy policy includes a requirement for a redundancy site and a time interval requirement for replicating data from the production site to the redundancy site. Then, the cloud management platform obtains storage replication information from M storage devices at the production site. The storage replication information indicates a data replication direction of each of the M storage devices and a data replication time interval of each storage device. Afterwards, the cloud management platform determines, based on the storage replication information and from the M storage devices, N storage devices that meet the first redundancy policy. Finally, the cloud management platform controls a virtualization platform to create a virtual machine, and instructs, in a virtual machine creation request, to create a magnetic disk used by the virtual machine on the N storage devices. Therefore, according to the solutions provided in the embodiments of the present disclosure, the cloud management platform can automatically select, from M storage devices according to storage replication information, N storage devices that meet a first redundancy policy, and create a magnetic disk of a virtual machine on the N storage devices, to further create the virtual machine. In this way, manual intervention is no longer required during a virtual machine creation process such that a possibility of errors caused by manual intervention is reduced, and automatic creation of the virtual machine is implemented.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases, only A exists, both A and B exist, and only B exists. In addition, the character "/" in this specification generally indicates an "or" relationship between the associated objects.

The following describes the implementation manners of the present disclosure in detail with reference to accompanying drawings.

An embodiment of this application provides a virtual machine creation method.

Referring to FIG. 1, the method includes the following steps.

Step S1: A cloud management platform at a production site obtains a first redundancy policy.

Step S2: The cloud management platform obtains storage replication information from M storage devices at the production site.

Step S3: The cloud management platform determines, based on the storage replication information and from the M storage devices, N storage devices that meet the first redundancy policy.

Step S4: The cloud management platform controls a virtualization platform to create a virtual machine, and instructs, in a virtual machine creation request, to create a magnetic disk used by the virtual machine on the N storage devices.

Before the technical solutions of the embodiments of this application are described, a production site is first described briefly. A person skilled in the art should understand that, during a specific implementation process, there are multiple sites, and a basic structure of the production site in the embodiments of this application is similar to that of a redundancy site or another site. In the embodiments of this application, a site that performs the virtual machine creation method in the embodiments of this application is referred to as the production site, and a site that provides a redundancy capability for the production site is referred to as the redundancy site. In addition, the production site in the embodiments of this application may also be used as a redundancy site of another site.

The following describes the basic structure of the production site.

The production site includes M storage devices, which are configured to store data of the production site. M is a positive integer, for example, 3, 5, or 73. The production site may write data into the M storage devices, and may also read data from the M storage devices. There are multiple servers at the production site. Supported by a virtualization technology, the multiple servers can access a same partition of one storage device. During a specific implementation process, a storage device may be a network attached storage (NAS), or may be a storage area network (SAN). The storage device may be configured by a person skilled in the art of this application according to an actual requirement. A specific limitation is not imposed in this application.

A cloud management platform is configured to manage a virtualization platform at a production site, and provide a data service for a user based on the virtualization platform. The user can manage the production site on the cloud management platform.

A virtualization platform is configured to provide a capability of virtualizing a physical resource, and the capability includes a capability of providing virtualized computing, network, and storage resources.

Redundancy software is used to configure a redundancy policy, replicate a redundancy policy to a redundancy site, or receive a redundancy policy replicated from another site that needs a redundancy capability provided by a production site. During a redundancy process, the redundancy software provides a redundancy policy for a site at which the redundancy software runs, and recovers a protected virtual machine according to the redundancy policy.

The following describes the method in this embodiment of this application.

Before step S1 in this embodiment of this application, an administrator configures M storage devices at the production site.

Figure 2:
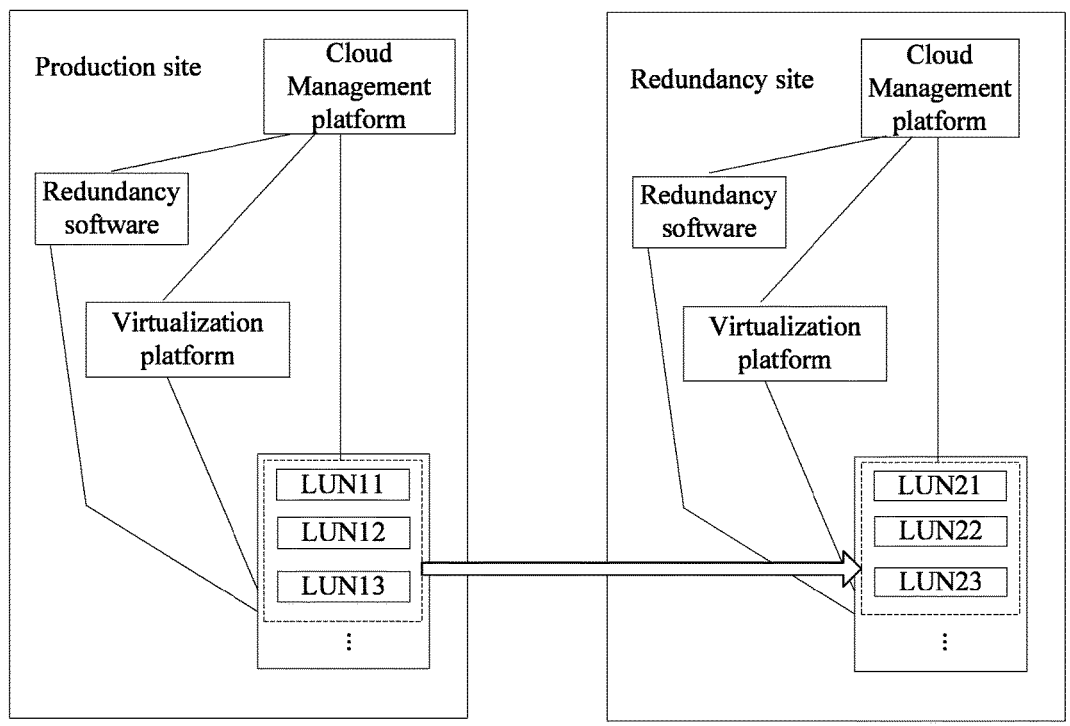
FIG. 2 is a schematic structural diagram of a production site and a redundancy site according to an embodiment of the present disclosure.

For ease of description, that M storage devices are SANs is used as an example for describing a configuration method. For details, refer to FIG. 2. A SAN has multiple logical unit numbers (LUN), for example, a SAN1 of the production site has a LUN11, a LUN12, a LUN13, and so on. The administrator divides the multiple LUNs into multiple consistency groups as required. Each consistency group includes at least one LUN. A consistency group in this embodiment of this application includes one or more LUNs, in a storage device, that have same storage replication information. Data in the consistency group is replicated or stops being replicated at the same time. The storage replication information indicates a data replication direction of each storage device and a data replication time interval of each storage device.

Further, the administrator configures a replication direction of each consistency group. In this embodiment of this application, configuring a replication direction means configuring a storage device of a specific site to which data of each LUN in a consistency group is to be replicated. In addition, the administrator further needs to configure a replication time of each consistency group. In this embodiment of this application, configuring a replication time means configuring a time interval between time points of current replication and last replication. After the configuration is completed, data in the consistency group is automatically replicated according to the replication direction and the replication time.

After the configuration is completed, the storage device generates corresponding storage replication information, which may also be referred to as a configuration attribute.

For example, it is assumed that the administrator divides a LUN11, a LUN12, and a LUN13 into a consistency group 1, a production site is located in Shenzhen, and configures a replication direction of the consistency group 1 as a direction from the production site to a site in Xi'an, a replication time as five minutes, and the like, to further generate storage replication information. For example consider the following.

ReplicateGroup1:{lunId=11, 12, 13};
ReplicateGroup01.replicateDirection:{from(shenzhen), to(xi'an)};
ReplicateGroup1.replicateInterval:{5 min};
. . .

In this case, after the configuration is completed, data of the LUN11, the LUN12, and the LUN13 in the consistency group 1 is replicated to three LUNs at the site in Xi'an every five minutes, for example, the three LUNs at the site in Xi'an are a LUN21, a LUN22, and a LUN23.

During a specific replication process, all data of the production site is replicated to a storage device at another site. Certainly, to reduce data processing load, a better manner is performing full replication for the first time, and replicating only incremental data to the storage device at the other site from then on. However, a data replication manner may be determined by a person skilled in the art of this application according to an actual requirement. A specific limitation is not imposed in this application.

After the configuration is completed, step S1 in this embodiment of this application may be performed. In addition, manual intervention of the administrator is no longer required during a subsequent creation process.

Further, a user creates the first redundancy policy on the cloud management platform. In this embodiment of this application, the first redundancy policy may be created when the user needs to create a virtual machine, or may be created and stored on the cloud management platform before a virtual machine is created. A specific limitation is not imposed in this application.

The first redundancy policy includes but is not limited to a user requirement for a redundancy site, a time interval requirement for replicating data from the production site to the redundancy site, information about a virtual machine, a virtual machine recovery sequence during a redundancy process, and the like. The requirement for the redundancy site is further a requirement for a data replication direction of the production site. For example, it is required that a replication direction should be from the production site to a site in Beijing or each site in Shanghai.

To automatically create a virtual machine for the user, the cloud management platform needs to obtain the storage replication information of the M storage devices to learn storage statuses of the M storage devices.

There are multiple manners for obtaining the storage replication information of the M storage devices. Two manners are used below as examples for detailed description. During a specific implementation process, the manners for obtaining the storage replication information include but are not limited to the following two manners.

A first manner: The cloud management platform obtains the storage replication information provided by each storage device.

Further, when needing the storage replication information, the cloud management platform may obtain the storage replication information directly from the M storage devices. In this embodiment of this application, there are two manners for obtaining the storage replication information from the M storage devices by the cloud management platform.

(1) After the configuration is completed, the M storage devices separately send the storage replication information to the cloud management platform before a virtual machine is created, and the cloud management platform stores the storage replication information after receiving the storage replication information. Generally, the storage replication information does not change arbitrarily. Therefore, in step S2, the cloud management platform may directly open the pre-stored storage replication information when the storage replication information needs to be obtained.

(2) After receiving a request that the user needs to create a virtual machine and obtaining the first redundancy policy, the cloud management platform sends, to the M storage devices, request information for requesting the M storage devices to provide the storage replication information. After receiving the request information sent by the cloud management platform, the M storage devices separately feed back their storage replication information to the cloud management platform.

A second manner: The cloud management platform sends a query request to a virtualization platform at the production site.

The cloud management platform obtains the storage replication information that is obtained by the virtualization platform by querying the M storage devices based on the query request.

Further, the cloud management platform in this embodiment of this application may directly obtain the storage replication information of the M storage devices, or may obtain the storage replication information from the virtualization platform.

First, the cloud management platform sends the query request to the virtualization platform at the production site. After receiving the query request, the virtualization platform queries the M storage devices, to further obtain the storage replication information of the M storage devices.

After obtaining the storage replication information, the virtualization platform further sends the storage replication information to the cloud management platform. In this way, the cloud management platform obtains the storage replication information.

During a specific implementation process, an interface for exchanging data between a storage device and the cloud management platform or the virtualization platform may be implemented using the Storage Management Initiative Specification (SMI-S) protocol.

The following describes a specific implementation manner of step S3.

The first redundancy policy includes a user requirement for a site that provides a redundancy capability. The cloud management platform creates, according to the first redundancy policy, a virtual machine on N storage devices that meet the first redundancy policy.

In this embodiment of this application, a specific implementation process of step S3 includes determining, from the M storage devices according to the storage replication information, K storage devices whose data replication direction meets the requirement for the data replication direction, where N≤K≤M, and K is an integer, and determining, from the K storage devices according to the data replication time interval, the N storage devices that meet the requirement for the data replication time interval.

Further, the storage replication information includes a data replication direction of each of the M storage devices. Therefore, the cloud management platform may automatically determine, according to the data replication direction, the K storage devices that meet the requirement for the data replication direction, where K is an integer, and N≤K≤M.

For example, it is assumed that the requirement for the data replication direction is from Shenzhen to Xi'an, M is 3, a data replication direction of a consistency group A1 in a first storage device is from Shenzhen to Shanghai. A second storage device has three consistency groups, a group B1, a group B2, and a group B3, and data replication directions are from Shenzhen to Shanghai, from Shenzhen to Xi'an, and from Shenzhen to Beijing, respectively. A third storage device has two consistency groups, C1 and C2, and data replication directions are both from Shenzhen to Xi'an. It is assumed that the storage replication information is as follows:

ReplicateGroupA1.replicateDirection:{from(shenzhen), to(shanghai)};
ReplicateGroupB1.replicateDirection:{from(shenzhen), to(shanghai)};
ReplicateGroupB2.replicateDirection:{from(shenzhen), to(xi'an)};
ReplicateGroupB3.replicateDirection:{from(shenzhen), to(beijing)};
ReplicateGroupC1.replicateDirection:{from(shenzhen), to(xi'an)};
ReplicateGroupC2.replicateDirection:{from(shenzhen), to(xi'an)};

In this case, the cloud management platform may determine that, in the three storage devices, the second storage device and the third storage device meet the user requirement for the data replication direction.

Further, the cloud management platform determines the N storage devices from the K storage devices, to create the virtual machine.

The foregoing example in which the K storage devices are determined continues to be used for description.

It is assumed that the user requirement for the data replication time interval is that replication is performed once at least every five minutes.

In addition, it is assumed that a time interval for the group B2 in the second device to replicate data is three minutes, and time intervals for the group C1 and the group C2 in the third storage device to replicate data are five minutes and six minutes, respectively. It is assumed that the storage replication information is as follows:

ReplicateGroupB2.replicateDirection:{from(shenzhen), to(xi'an)};
ReplicateGroupB2. replicateInterval:{3 min};
ReplicateGroupC1.replicateDirection:{from(shenzhen), to(xi'an)};
ReplicateGroupC1.replicateInterval:{5 min};
ReplicateGroupC2.replicateDirection:{from(shenzhen), to(xi'an)};
ReplicateGroupC2.replicateInterval:{6 min};

In this case, the cloud management platform may determine that storage devices that meet the requirement for the data replication time interval are the second storage device and the third device, further that is, the group B2 in the second device and the group C1 in the third device.

After the N storage devices are determined, step S4 is performed.

The cloud management platform sends a creation request for creating a virtual machine to the virtualization platform, and instructs, in the creation request, the virtualization platform to create a magnetic disk of the virtual machine on the N storage devices. After receiving the creation request, the virtualization platform creates the magnetic disk of the virtual machine on the N storage devices in order to complete creation of the virtual machine.

As described above, a cloud management platform can automatically select, from M storage devices according to storage replication information, N storage devices that meet a first redundancy policy, and create a virtual machine on the N storage devices. In this way, manual intervention is no longer required during a virtual machine creation process such that a possibility of errors caused by manual intervention is reduced, and automatic creation of the virtual machine is implemented.

In addition, if the storage replication information does not include information about a redundancy requirement of the user. For example, the redundancy requirement includes a requirement for a data replication direction and a requirement for a data replication time interval, but the storage replication information does not include the data replication direction or the data replication time interval. In this case, the administrator may store the data replication direction and the data replication time interval of the M storage devices to the cloud management platform before the virtual machine is created. However, intervention of the administrator is not required during the virtual machine creation process.

Subsequently, the virtual machine creation method in this embodiment of this application further includes creating a second redundancy policy corresponding to the first redundancy policy, where the first redundancy policy runs on the cloud management platform, and the second redundancy policy runs on redundancy software of the production site, and adding the virtual machine to the second redundancy policy.

Further, an entity for running the first redundancy policy is the cloud management platform. During a redundancy process, a redundancy policy is provided by the redundancy software for a redundancy site. The cloud management platform and the redundancy software may be provided by two manufacturers, and a description format of the policy executed by the cloud management platform is different from that of the policy executed by the redundancy software. Therefore, the second redundancy policy corresponding to the first redundancy policy needs to be created. The first redundancy policy runs on the cloud management platform, while the second redundancy policy runs on the redundancy software.

After the creation is completed, the cloud management platform further calls an interface of the redundancy software to add the virtual machine created in steps S1 to S4 to the second redundancy policy such that information, such as a storage device on which the magnetic disk of the virtual machine is located, and an identifier of the virtual machine, is obtained for the second redundancy policy.

The interface of the redundancy software may be defined using the Hypertext Transfer Protocol (HTTP) at a transport layer, and using Representational State Transfer (REST), the Simple Object Access Protocol (SOAP), or another protocol or specification at an application layer. A specific limitation is not imposed in this application.

Finally, the second redundancy policy is replicated to the redundancy site. After the creation is completed, data in the N storage devices of the virtual machine that is created in the foregoing process is automatically replicated to a storage device corresponding to the redundancy site.

The following describes the redundancy process.

The administrator of the redundancy site disconnects the production site from the redundancy site when the production site suffers from unrecoverable damage. Then, the redundancy software provides and runs the second redundancy policy, to instruct the redundancy process of the redundancy site. Details are as follows.

The data in the N storage devices is replicated to P storage devices at the redundancy site before redundancy is performed, where P is a positive integer and may be the same as or different from N. During the redundancy process, the P storage devices at the redundancy site are mounted to the virtualization platform. The redundancy software registers the information about the virtual machine with the cloud management platform at the redundancy site according to the identifier of the to-be-recovered virtual machine and a recovery sequence that are described in the redundancy policy. The cloud management platform then calls an interface of the virtualization platform to register the corresponding virtual machine. The virtualization platform finds, on the storage device, the data and the magnetic disk of the to-be-recovered virtual machine, and then recovers the virtual machine.

After the foregoing recovery process, the data of the production site is recovered at the redundancy site, and a service of the production site is provided by the redundancy site instead.

Further, if the user needs to cancel redundancy configuration for the virtual machine, the following is executed.

The user first removes the first redundancy policy from the cloud management platform. After obtaining an instruction for removing the first redundancy policy, the cloud management platform removes the first redundancy policy in response to the instruction, and further calls the interface of the redundancy software to delete the virtual machine from the second redundancy policy. Finally, the cloud management platform calls the interface of the virtualization platform to migrate the virtual machine from the N storage devices to M-N storage devices other than the N storage devices, to cancel a redundancy function of the virtual machine.

Figure 3:
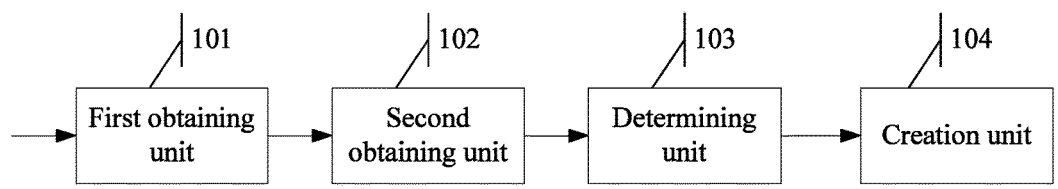
FIG. 3 is a schematic structural diagram of a virtual machine creation apparatus according to an embodiment of the present disclosure.

An embodiment of this application provides a virtual machine creation apparatus. Referring to FIG. 3, the apparatus includes a first obtaining unit 101 configured to obtain a first redundancy policy, where the first redundancy policy includes a requirement for a redundancy site and a time interval requirement for replicating data from a production site to the redundancy site, and the requirement for the redundancy site includes a requirement for a data replication direction of the production site, a second obtaining unit 102 configured to obtain storage replication information from M storage devices at the production site, where the storage replication information indicates a data replication direction of each of the M storage devices and a data replication time interval of each storage device, and M is a positive integer, a determining unit 103 configured to determine, based on the storage replication information and from the M storage devices, N storage devices that meet the first redundancy policy, where N is an integer, and $N \leq M$, and a creation unit 104 configured to control a virtualization platform to create a virtual machine, and instruct, in a virtual machine creation request, to create a magnetic disk used by the virtual machine on the N storage devices, to create the virtual machine.

The second obtaining unit 102 is further configured to obtain the storage replication information provided by each storage device.

Alternatively, the second obtaining unit 102 is further configured to send a query request to the virtualization platform at the production site, and obtain the storage replication information that is obtained by the virtualization platform by querying the M storage devices based on the query request.

Further, the first redundancy policy includes a redundancy direction. In this case, the determining unit 103 is further configured to determine, from the M storage devices according to the storage replication information, K storage devices whose data replication direction meets the requirement for the data replication direction, where $N \leq K \leq M$, and K is an integer, and determine, from the K storage devices according to the data replication time interval, the N storage devices that meet the requirement for the data replication time interval.

In addition, the apparatus in this embodiment of this application further includes the creation unit 104 configured to create a second redundancy policy corresponding to the first redundancy policy, where the first redundancy policy runs on a cloud management platform, and the second redundancy policy runs on redundancy software of the production site, and add the virtual machine to the second redundancy policy, and a replication unit (not shown) configured to replicate the second redundancy policy to the redundancy site, where the redundancy site can provide a redundancy capability for the production site.

An embodiment of this application provides an electronic device. For meanings of terms related to the electronic device and specific implementation of the electronic device shown in FIG. 4, reference may be made to FIG. 1 to FIG. 3 and related descriptions of the embodiments.

Figure 4:
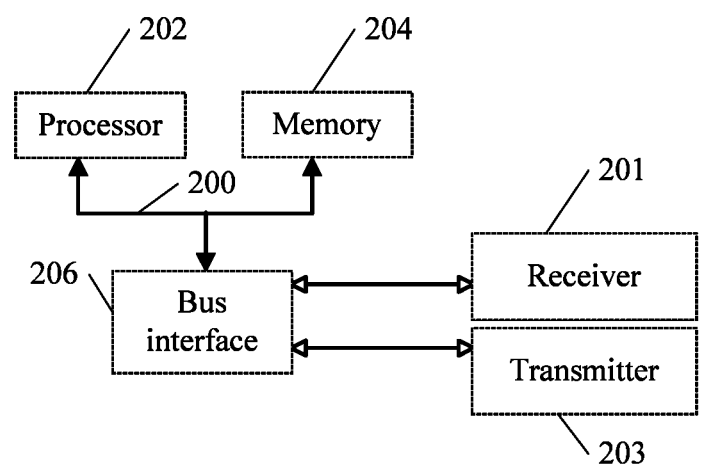
FIG. 4 is a schematic structural diagram of an electronic device according to an embodiment of the present disclosure.

Referring to FIG. 4, the electronic device includes a processor 202 configured to obtain a first redundancy policy, where the first redundancy policy includes a requirement for a redundancy site and a time interval requirement for replicating data from a production site to the redundancy site, and the requirement for the redundancy site includes a requirement for a data replication direction of the production site, obtain storage replication information from M storage devices at the production site, where the storage replication information indicates a data replication direction of each of the M storage devices and a data replication time interval of each storage device, and M is a positive integer, determine, based on the storage replication information and from the M storage devices, N storage devices that meet the first redundancy policy, where N is an integer, and N≤M, and control a virtualization platform to create a virtual machine, and instruct, in a virtual machine creation request, to create a magnetic disk used by the virtual machine on the N storage devices, to create the virtual machine.

Optionally, the processor 202 is further configured to obtain the storage replication information provided by each storage device.

Alternatively, the processor 202 is further configured to send a query request to the virtualization platform at the production site, and obtain the storage replication information that is obtained by the virtualization platform by querying the M storage devices based on the query request.

Optionally, when the first redundancy policy includes a redundancy direction, the processor 202 is further configured to determine, from the M storage devices according to the storage replication information, K storage devices whose data replication direction meets the requirement for the data replication direction, where N≤K≤M, and K is an integer, and determine, from the K storage devices according to the data replication time interval, the N storage devices that meet the requirement for the data replication time interval.

Optionally, the processor 202 is further configured to create a second redundancy policy corresponding to the first redundancy policy after instructing, in the virtual machine creation request, to create the magnetic disk used by the virtual machine on the N storage devices, where the first redundancy policy runs on a cloud management platform, and the second redundancy policy runs on redundancy software of the production site, and add the virtual machine to the second redundancy policy.

Optionally, the processor 202 is further configured to replicate the second redundancy policy to the redundancy site after adding the virtual machine to the second redundancy policy, where the redundancy site can provide a redundancy capability for the production site.

In FIG. 4, a bus architecture, that is, a bus 200, may include any number of interconnected buses and bridges. The bus 200 connects one or more processors represented by the processor 202 to each circuit of a memory represented by a memory 204. The bus 200 may further connect a peripheral device (not shown) and a voltage stabilizer (not shown) to other circuits such as a power management circuit (not shown). This is known in other approaches, and the specification does not provide a further description. A bus interface 206 is an interface between the bus 200 and a receiver 201, and between the bus 200 and a transmitter 203. The receiver 201 and the transmitter 203 may be incorporated into one component, that is, a transceiver (not shown). The transceiver may be a unit configured to communicate with another apparatus on a transmission medium.

The processor 202 is responsible for management of the bus 200 and general processing, and the memory 204 may be configured to store data that is used by the processor 202 during an operation.

The variation manners for the virtual machine creation process and the specific instances that are described in the foregoing embodiments are also applicable to the electronic device in this embodiment. Based on the detailed descriptions, a person skilled in the art can clearly know a method for implementing the electronic device in this embodiment. For brevity of the specification, details are not described herein again.

One or more technical solutions in this embodiment of the present disclosure have at least the following technical effects or advantages.

First, a cloud management platform at a production site obtains a first redundancy policy, where the first redundancy policy includes a requirement for a redundancy site and a time interval requirement for replicating data from the production site to the redundancy site. Subsequently, the cloud management platform obtains storage replication information from M storage devices at the production site, where the storage replication information indicates a data replication direction of each of the M storage devices and a data replication time interval of each storage device. Afterwards, the cloud management platform determines, based on the storage replication information and from the M storage devices, N storage devices that meet the first redundancy policy. Finally, the cloud management platform controls a virtualization platform to create a virtual machine, and instructs, in a virtual machine creation request, to create a magnetic disk used by the virtual machine on the N storage devices. Therefore, according to the solutions provided in this embodiment of the present disclosure, the cloud management platform can automatically select, from M storage devices according to storage replication information, N storage devices that meet a first redundancy policy, and create a magnetic disk of a virtual machine on the N storage devices, to further create the virtual machine. In this way, manual intervention is no longer required during a virtual machine creation process such that a possibility of errors caused by manual intervention is reduced, and automatic creation of the virtual machine is implemented.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a magnetic disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope defined by the following claims and their equivalent technologies.

What is claimed is:

1. A virtual machine creation method, comprising:
   obtaining, by a cloud management platform at a production site, a first redundancy policy, the first redundancy policy comprising a requirement for a redundancy site and a time interval requirement for replicating data from the production site to the redundancy site, and the requirement for the redundancy site comprising a requirement for a data replication direction of the production site;
   obtaining, by the cloud management platform, storage replication information from M storage devices at the production site, the storage replication information indicating a data replication direction of each of the M storage devices and a data replication time interval of each storage device, and M being a positive integer;
   determining, by the cloud management platform based on the storage replication information and from the M storage devices, N storage devices that meet the first redundancy policy, N being an integer, and N≤M;
   controlling, by the cloud management platform, a virtualization platform to create a virtual machine;
   instructing, in a virtual machine creation request, to allocate magnetic disk space used by the virtual machine on the N storage devices in creating the virtual machine;
   creating a second redundancy policy corresponding to the first redundancy policy, the first redundancy policy running on the cloud management platform, and the second redundancy policy running on redundancy software of the production site;
   adding the virtual machine to the second redundancy policy; and
   replicating the second redundancy policy to the redundancy site, the redundancy site providing a redundancy capability for the production site.

2. The method of claim 1, wherein obtaining the storage replication information comprises obtaining, by the cloud management platform, the storage replication information provided by each storage device.

3. The method of claim 1, wherein obtaining the storage replication information comprises:
   sending, by the cloud management platform, a query request to the virtualization platform at the production site; and
   obtaining, by the cloud management platform, the storage replication information that is obtained by the virtualization platform by querying the M storage devices based on the query request.

4. The method of claim 2, wherein determining the N storage devices comprises:
   determining, from the M storage devices according to the storage replication information, K storage devices whose data replication direction meets the requirement for the data replication direction, N≤K≤M, and K being an integer; and
   determining, from the K storage devices according to the data replication time interval, the N storage devices that meet the requirement for the data replication time interval.

5. A virtual machine creation apparatus, comprising:
   a memory comprising instructions; and
   a processor coupled to the memory, the instructions causing the processor to be configured to:
      obtain a first redundancy policy, the first redundancy policy comprising a requirement for a redundancy site and a time interval requirement for replicating data from a production site to the redundancy site, and the requirement for the redundancy site comprising a requirement for a data replication direction of the production site;
      obtain storage replication information from M storage devices at the production site, the storage replication information indicating a data replication direction of each of the M storage devices and a data replication time interval of each storage device, and M being a positive integer;
      determine, based on the storage replication information and from the M storage devices, N storage devices that meet the first redundancy policy, N being an integer, and N≤M;
      control a virtualization platform to create a virtual machine;
      instruct, in a virtual machine creation request, to allocate magnetic disk space used by the virtual machine on the N storage devices in creating the virtual machine;
      create a second redundancy policy corresponding to the first redundancy policy, the first redundancy policy running on a cloud management platform, and the second redundancy policy running on redundancy software of the production site;
      add the virtual machine to the second redundancy policy; and replicate the second redundancy policy to the redundancy site, the redundancy site providing a redundancy capability for the production site.

6. The apparatus of claim 5, wherein the instructions further cause the processor to be configured to obtain the storage replication information provided by each storage device.

7. The apparatus of claim 5, wherein the instructions further cause the processor to be configured to:
send a query request to the virtualization platform at the production site; and
obtain the storage replication information that is obtained by the virtualization platform by querying the M storage devices based on the query request.

8. The apparatus of claim 6, wherein the instructions further cause the processor to be configured to:
determine, from the M storage devices according to the storage replication information, K storage devices whose data replication direction meets the requirement for the data replication direction, N≤K≤M, and K being an integer; and
determine, from the K storage devices according to the data replication time interval, the N storage devices that meet the requirement for the data replication time interval.

9. A virtual machine creation method, comprising:
obtaining, by a cloud management platform at a production site, a first redundancy policy, the first redundancy policy comprising a requirement for a redundancy site and a time interval requirement for replicating data from the production site to the redundancy site, and the requirement for the redundancy site comprising a requirement for a data replication direction of the production site;
obtaining, by the cloud management platform, storage replication information from M storage devices at the production site, the storage replication information indicating a data replication direction of each of the M storage devices and a data replication time interval of each storage device, M being a positive integer, and the storage replication information being obtained by the cloud management platform obtaining the storage replication information provided by each storage device;
determining, by the cloud management platform based on the storage replication information and from the M storage devices, N storage devices that meet the first redundancy policy, N being an integer, N≤M, and the N storage devices being determined by:
determining, from the M storage devices according to the storage replication information, K storage devices whose data replication direction meets the requirement for the data replication direction, N≤K≤M, and K being an integer; and
determining, from the K storage devices according to the data replication time interval, the N storage devices that meet the requirement for the data replication time interval;
controlling, by the cloud management platform, a virtualization platform to create a virtual machine; and
instructing, in a virtual machine creation request, to allocate magnetic disk space used by the virtual machine on the N storage devices in creating the virtual machine.

10. The method of claim 9, wherein obtaining the storage replication information comprises:

sending, by the cloud management platform, a query request to the virtualization platform at the production site; and
obtaining, by the cloud management platform, the storage replication information that is obtained by the virtualization platform by querying the M storage devices based on the query request.

11. The method of claim 9, wherein after instructing to allocate the magnetic disk space, the method further comprises:
creating a second redundancy policy corresponding to the first redundancy policy, the first redundancy policy running on the cloud management platform, and the second redundancy policy running on redundancy software of the production site; and
adding the virtual machine to the second redundancy policy.

12. The method of claim 11, wherein after adding the virtual machine to the second redundancy policy, the method further comprises replicating the second redundancy policy to the redundancy site, the redundancy site providing a redundancy capability for the production site.

13. A virtual machine creation apparatus, comprising:
a memory comprising instructions; and
a processor coupled to the memory, the instructions causing the processor to be configured to:
obtain a first redundancy policy, the first redundancy policy comprising a requirement for a redundancy site and a time interval requirement for replicating data from a production site to the redundancy site, the requirement for the redundancy site comprising a requirement for a data replication direction of the production site, and the data replication direction of the production site indicating a specific storage device of the redundancy site to which the data is to be replicated;
obtain storage replication information from M storage devices at the production site, the storage replication information indicating a data replication direction of each of the M storage devices and a data replication time interval of each storage device, and M being a positive integer;
determine, based on the storage replication information and from the M storage devices, N storage devices that meet the first redundancy policy, N being an integer, and N≤M;
control a virtualization platform to create a virtual machine;
instruct, in a virtual machine creation request, to allocate magnetic disk space used by the virtual machine on the N storage devices in creating the virtual machine;
obtain the storage replication information provided by each storage device;
determine, from the M storage devices according to the storage replication information, K storage devices whose data replication direction meets the requirement for the data replication direction, N≤K≤M, and K being an integer; and
determine, from the K storage devices according to the data replication time interval, the N storage devices that meet the requirement for the data replication time interval.

14. The apparatus of claim 13, wherein the instructions further cause the processor to be configured to:
send a query request to the virtualization platform at the production site; and obtain the storage replication information that is obtained by the virtualization platform by querying the M storage devices based on the query request.

15. The apparatus of claim 13, wherein after instructing to allocate the magnetic disk space, the instructions further cause the processor to be configured to:
create a second redundancy policy corresponding to the first redundancy policy, the first redundancy policy running on a cloud management platform, and the second redundancy policy running on redundancy software of the production site; and
add the virtual machine to the second redundancy policy.

16. The apparatus of claim 15, wherein after the virtual machine is added to the second redundancy policy, the instructions further cause the processor to be configured to replicate the second redundancy policy to the redundancy site, the redundancy site providing a redundancy capability for the production site.

* * * * *